United States Patent [19]

Mason et al.

[11] Patent Number: 5,760,860
[45] Date of Patent: Jun. 2, 1998

[54] ELECTRO-OPTIC SCATTERING TYPE DEVICES WITH COLOR POLARISER FOR SWITCHABLE COLOR

[75] Inventors: Ian Robert Mason; Damien Gerard McDonnell; Sarah Caroline Guy, all of Malvern, United Kingdom

[73] Assignee: The Secretary of State for Defense in Her Britannic Majesty's Government of the United Kingdom of Great Britain and Northern Ireland, Hants, United Kingdom

[21] Appl. No.: 696,878

[22] PCT Filed: Feb. 17, 1994

[86] PCT No.: PCT/GB95/00333

§ 371 Date: Aug. 20, 1996

§ 102(e) Date: Aug. 20, 1996

[87] PCT Pub. No.: WO95/23354

PCT Pub. Date: Aug. 31, 1995

[30] Foreign Application Priority Data

Feb. 25, 1994 [GB] United Kingdom ............... 9403630

[51] Int. Cl.⁶ ............................................. G02F 1/133
[52] U.S. Cl. ............................................. 349/86; 349/97
[58] Field of Search ........................................ 349/86, 97

[56] References Cited

U.S. PATENT DOCUMENTS 4,610,507  9/1986  Kamamori et al.
5,099,343  3/1992  Margerum et al.

FOREIGN PATENT DOCUMENTS

| 0127374 | 5/1984 | European Pat. Off. |
| 0237160 | 1/1987 | European Pat. Off. |
| 0365778 | 8/1989 | European Pat. Off. |
| 0559378A1 | 2/1993 | European Pat. Off. |
| 1526559 | 10/1975 | United Kingdom. |
| 2139778 | 5/1984 | United Kingdom. |
| WO 87/-6-2- | 10/1987 | WIPO. |
| WO88/02128 | 3/1988 | WIPO. |
| WO91/09092 | 6/1991 | WIPO. |

OTHER PUBLICATIONS

Journal of the Society for Information Display, Dec. 1993, USA, vol. 1, No. 4, ISSN 0734-1768, pp. 417-422, Yoshida H et al 'A full-color TFT-LCD with a polymer-dispersed structure' cited in the application see sections 1.3.1.3.2.4.2; figure 2.

Primary Examiner—William L. Sikes
Assistant Examiner—Kenneth Parker
Attorney, Agent, or Firm—Nixon & Vanderhye P.C.

[57] ABSTRACT

An electro-optic color device including a layer of polymer dispersed liquid crystal (7), with polarizers on either side (9,10), at least one being colored. By applying a voltage across the polymer dispersed liquid crystal cell (PDLC), the cell is switched from a scattering to a non-scattering state or vice-versa, and the color of the transmitted light is controlled. Applications include membrane switches.

23 Claims, 3 Drawing Sheets

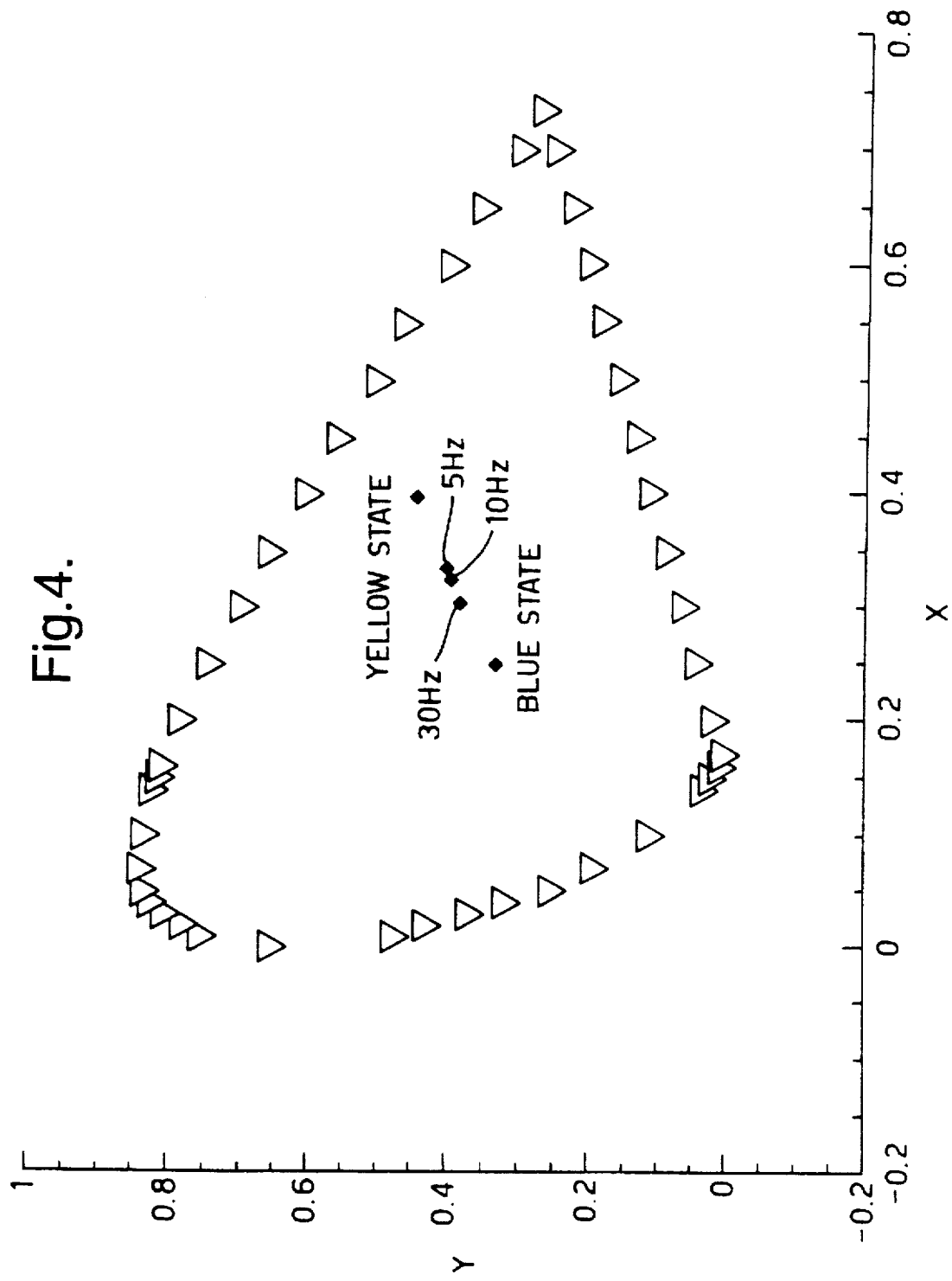

ELECTRO-OPTIC SCATTERING TYPE DEVICES WITH COLOR POLARISER FOR SWITCHABLE COLOR

This invention relates to novel electro-optic colour devices, more specifically to liquid crystal colour shutters and switches.

Liquid crystal materials are widely used in liquid crystal displays such as watches, calculators etc. Most displays of this type consist of a thin film of a liquid crystalline composition sandwiched in a cell between two substrates, at least one of which is transparent, and having transparent electrodes on their inner surfaces. On applying a potential difference across the electrodes the alignment of the molecules of the liquid crystalline composition is altered, resulting in an electro-optic effect in the material, which is exploited by the display. Most often electro-optic effects in the nematic liquid crystal phase are exploited in such displays. Examples of types of displays include the twisted nematic, the Freedericksz effect device, cholesteric memory mode device, cholesteric to nematic phase change effect device, dynamic scattering effect device, two frequency switching effect device and the 'supertwist' effect device. Other types of device include active matrix twisted nematics and pi-cells.

In general the above liquid crystal devices comprise cells made from glass substrates. There are numerous problems associated with the manufacture of glass cells and therefore devices, for example the limitations concerning the angle of view of such devices in practice limits the size of such cells to approximately 50 cm across the diagonal.

A type of liquid crystal display has been developed in which droplets of a suitable liquid crystalline composition are dispersed in a solid light transmissive polymeric matrix. In the art such materials are known as polymer dispersed liquid crystals (PDLC) and/or as nematic-curvilinear aligned phase (NCAP) materials because of their construction and physics respectively. Typically PDLCs and NCAPs consist of a dispersion of nematic liquid crystal material in a continuous polymer matrix. Light is scattered from such materials because of a mismatch between the refractive index of the droplets and the matrix. When no field is applied incident light is efficiently scattered because of the mismatch of the refractive index of the droplets and the matrix. When a field is applied the alignment of the liquid crystal results in the droplets having an effective refractive index closer to the ordinary refractive index of the liquid crystal, $n_o$, for light incident normal to the material. The matrix has a refractive index, $n_p$, essentially equal to $n_o$ and therefore the material becomes transparent to incident light.

Problems associated with these type displays include low contrast.

Recent published work has shown that improved contrast ratio may be achieved by exploiting depolarisation properties between crossed polarisers; Yoshida et al Journal of the SID, Jan. 4, 1993 pp 417–22.

Some of the properties which need to be considered for optimising the performance of PDLC and related devices are set out below.

The ordinary refractive index $n_o$ of the composition should match or be similar to the refractive index of the polymer material, so that in the presence of an applied A field the material becomes as transparent as possible to incident light. Further desirable characteristics of the liquid crystal composition are a high birefringence, $\Delta n$, a high nematic to isotropic transition temperature T(N-I) and a low threshold voltage, $V_{th}$, for device operation.

There are various methods by which a PDLC can be constructed. J. W. Doane in Liquid Crystals, Applications and Uses vol I, ed. B. Bahadur pp361–95 1990, and references therein describes some of them. One of the methods is polymerization induced phase separation (PIPS). For the PIPS method it is important that the liquid crystal material must mix with a monomer with which it is soluble. The liquid crystal composition should be sufficiently soluble in the monomer chosen and be sufficiently less soluble in the polymer so that phase separation occurs. Some other techniques include: Thermally induced phase separation (TIPS), Solvent induced phase separation (SIPS) and Enscapulation.

Such materials may be made into large area display devices, such as windows, privacy screens etc without the problems mentioned above. References to such materials and devices are found in Mol. Cryst. Liq. Cryst. Inc. Nonlin. Opt. (1988) 17 427–441, Liquid Crystals (1988) 3(11) 1543–1559, FR 2.139.537, U.S. Pat. No. 4,435,047 and U.S. Pat. No. 4,688,900.

A range of compounds has been used in compositions for PDLC materials. The references mentioned above refer to the use of benzylidineanilines, 4-alkyl or alkoxy 4'-cyanobiphenyls or 4"-cyanoterphenyls, alkyl or alkoxy cyanophenylcyclohexanes or cyanobiphenylcyclohexanes and aromatic esters in these compositions. The use of laterally fluorinated 4-alkyl or alkoxy 4"-cyanoterphenyls mixed with other liquid crystal compounds in PDLCs is described in International Patent Application PCT/GB90/01947 which has International Publication number WO 91/09092.

Yoshida et al, Journal of the SID, Jan. 4, 1993, pp417–422 discuss the use of PDLCs in thin-film transistor liquid crystal displays.

It is known to use PDLC devices as colour shutters or switches. It has been shown that by placing a coloured card behind a PDLC film one can construct a simple colour switch as in the Merck Paperwhite™ display. However these only show a switch between an 'off-white' and coloured state. Alternatively it is known to incorporate dyes into the PDLC material. By adding a dye the polymer is also coloured, significantly reducing contrast.

UK patent GB 1,491,471 describes a colour display system comprising i.a. a liquid crystal filter and UK patent GB 1,469,638 describes a liquid crystal device whereby the colour of light transmitted by the device may be controlled.

The present invention overcomes the above problems relating to PDLC devices as colour shutters or switches by using a light modulating material such as a polymer dispersed liquid crystal in combination with coloured polarisers.

According to this invention an electro-optic colour device comprises a layer of a light modulating material between two polarisers at least one of the polarisers being coloured, and means for applying an electric field to the light modulating material, the arrangement being such that the colour of transmitted light is modulated by an electric field being applied to the light modulating material.

Preferably the device is operated such that in a zero applied field, light of one colour is observed and in a field applied state another colour is observed.

Preferably the light modulating material comprises a polymer matrix throughout which is dispersed droplets of a liquid crystal composition, eg a polymer dispersed liquid crystal.

Preferably the means for applying an electric field to the light modulating medium may be provided by, for example, the polymer matrix being sandwiched between two indium tin oxide electrodes which themselves may be mounted on the surface of two transparent substrates eg glass. The electrodes may also be of the following types: 7-bar numeric display, row and column or r, theta pattern.

The transparent substrates may be formed by the polarisers.

The device may work in a transmissive or reflective mode. A light source may be provided by, for example, a bulb or a large area backlight. The light source may be any colour of visible light and colour filters may also be incorporated into the device.

The coloured polariser may consist of one or more coloured polarisers preferably at least two.

The invention will now be described by way of example only with reference to the following drawings of which:

FIG. 4 is a 1931 C.I.E. chromaticity diagram illustrating colours obtained using blue and yellow polarisers and the effect of switching between blue and yellow states at various frequencies.

Figure 1A:
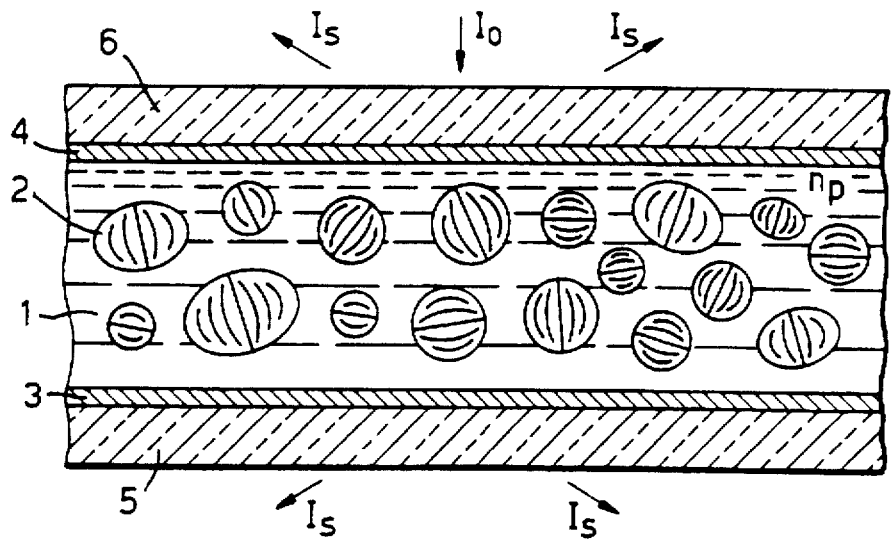
FIGS. 1A and 1B represent a cross sectional view of a polymer dispersed liquid crystal cell in a scattering and non-scattering state respectively.

Examples of the use of a light modulating material incorporated in a device embodying the present invention will now be described with reference to FIGS. 1–3.

Figure 1B:
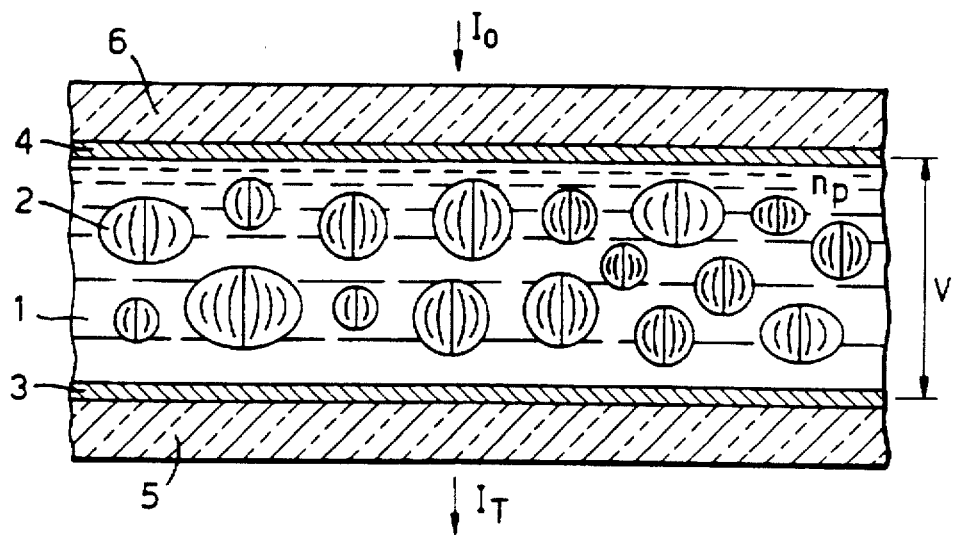
Figure 1C:
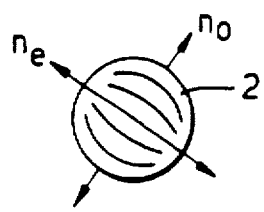
FIG. 1C illustrates ordinary and extraordinary refractive indices of liquid crystal molecules within a droplet.
Figure 2:
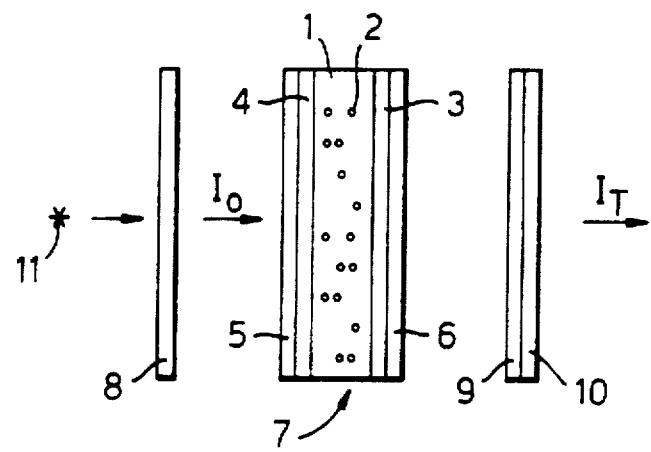
FIG. 2 is a representation of a electro-optic shutter acting as a colour switch.

As shown in FIGS. 1 and 2 an electro-optic shutter comprises a polymer dispersed liquid crystal (PDLC) cell 7 consisting of a film of a transparent solid polymeric matrix 1 having a refractive index $n_p$. Dispersed within the matrix are droplets 2 of a liquid crystal composition. The matrix 1 with dispersed droplets 2 is sandwiched between two indium tin oxide electrodes 3,4 which are themselves mounted on the surface of two transparent substrates 5,6 for example made from glass. Within the droplets 2 the director of the liquid crystal is oriented as a result of surface interactions between the liquid crystal and the polymer matrix 1 of the droplet—matrix interface.

The liquid crystal composition has an ordinary refractive index $n_o$ normal to the director and an extraordinary refractive index $n_e$ parallel to the director. The ordinary refractive index $n_o$ is similar to the refractive index $n_p$ of the matrix, but there is a mismatch between $n_e$ and $n_p$. When there is no electric field across the film 1, as in FIG. 1A, the directors of the liquid crystal droplets 2 are randomly oriented which gives the droplets a higher refractive index than the surrounding polymer therefore the droplet acts as a scattering centre and light incident $I_o$ is scattered as scattered light $I_s$. Some of the scattered light ($I_s$) is reflected and some of it is transmitted through the cell 7.

On application of an electric field across the film 1 as in FIG. 1B by applying a potential difference V between the electrodes 3, 4 the directors of the liquid crystal droplets (positive dielectric anisotropy) align parallel to the direction of the field. In this condition the refractive indices of polymer and droplets substantially match and the device becomes transparent, transmitting incident light $I_o$ as transmitted light $I_T$.

If the liquid crystal has a negative dielectric anisotropy or is of the two frequency type the PDLC can be formed to operate in reverse mode. In the reverse mode there is a refractive index mismatch in the $V_{ON}$ state and substantially no mismatch in the $V_{OFF}$ state.

In FIG. 2 the PDLC cell 7 is located between a plane polariser 8 and crossed coloured polarisers 9,10. The colour of the transmitted light $I_T$ is modulated by an electric voltage being applied to the cell 7. The shutter consists of a light source 11 arranged so that light may be transmitted through a plane polariser 8. The source of the light may be, for example, a light bulb or a large area backlight. Light passing through the plane polariser 8 is plane polarised and is then incident on the polymer dispersed liquid crystal cell 7. The PDLC cell 7 may either scatter the incident plane polarised light or transmit it largely unaltered. The PDLC is switched between scattering and non-scattering modes by the application of a voltage. When the PDLC is in a scattering mode the incident polarised light is depolarised by scattering as it passes through the cell 7. The arrangement of the crossed coloured polarisers 9,10 determines the colour of the transmitted light $I_T$.

In an alternative embodiment a colour filter may be placed between the light source 11 and the plane polariser 8 or between the plane polariser 8 and the polymer dispersed liquid crystal cell 7, or between 7 and 9 or after 10.

Figure 3:
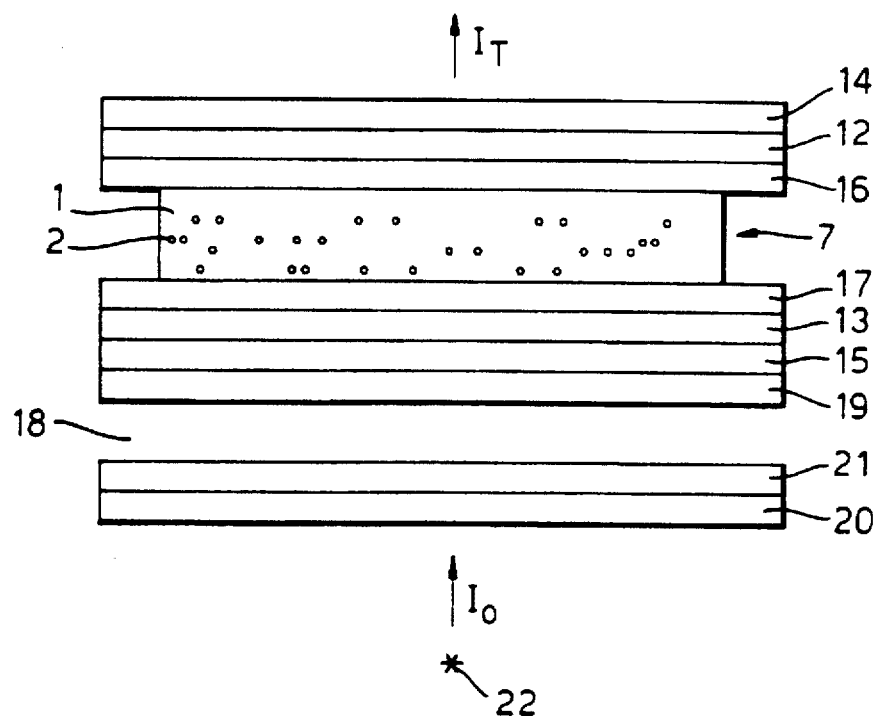
FIG. 3 is a representation of a electro-optic shutter acting as a membrane switch.

A membrane switch is shown in FIG. 3. This comprises a polymer dispersed liquid crystal cell 7 arranged between two flexible transparent substrates 12,13; polarisers 14, 15 may constitute these flexible transparent substrates or may be separate entities and attached to the substrates (as shown). The polariser 14 is typically a crossed coloured polariser. On the inside surfaces of the substrates 12,13 facing the PDLC device are located transparent conducting layers 16, 17 for example indium tin oxide, this allows a field to be applied across the cell. An insulating layer 18 eg air, or an adhesive, separates the plane polariser 15 which carries one or more transparent electrodes 19 on its outer surface from a layer 20 carrying one or more transparent electrodes 21. Behind this layer is a light source 22 eg a light bulb or a large area backlight.

Preferably the polymeric substrates are optically isotropic or set up in such a way so as to not affect the polarisation state of the light incident on them, for example the polymeric substrate is uniaxially drawn and aligned with the polariser or analyser.

To operate the membrane switch of FIG. 3 the surface 14 of the membrane switch is pressed and deforms, in turn the subsequent layers are deformed and contact is made between the two transparent electrodes 19 and 21. The switch is activated which may control one or several devices, for example the switch may be an on/off button for a television set. By activating the device, a voltage is applied a cross the polymer dispersed liquid crystal cell and the cell is switched from a scattering to a non-scattering state or vice-versa.

If the PDLC is in the scattering state then light from the light source 22 will be incident on the polariser 20 and be plane polarised; it is then depolarised by scattering through the polymer dispersed liquid crystal cell 7. The colour of the light $I_T$ then emerging through the device is dependent on the arrangement of colour polarisers 14. For example should there be scattered light incident on the crossed colour polarisers 14 then the colour of the transmitted light $I_T$ will be determined by the relative absorptivities of the colour polarisers. Alternatively when the light incident on the colour polarisers is plane polarised the colour polarisers are arranged accordingly to allow the plane polarised light through, which then becomes coloured plane polarised light.

The coloured polariser may comprise coloured polarisers being laid on top of other coloured polarisers. These polarisers may then make an angle to each other. Preferably this angle includes or is between the values 60°–125°. Even more preferably it is as close to 90° as possible.

Preferably the relationship between the colour and non-colour polarisers is such that the angle subtended by the non-colour polariser to one of the colour polarisers is 0°–5° and the angle subtended by the non-colour polariser to the other colour polariser is 85°–95°, even more preferably these angles are 0° and 90°.

For any of the above specific embodiments it is possible to introduce a third colour by switching the PDLC cell 7 between scattering and non-scattering states at a suitable frequency. For example if one were to switch sufficiently quickly between scattering and non-scattering states and the crossed polarisers were coloured blue and yellow then the light transmitted may appear green.

In an alternative of the embodiments described instead of the light source being provided by a backlight it is possible to use a polarisation maintaining reflector so that the device operates in a reflective mode. Also in an alternative embodiment the light source could be replaced by a cathode ray tube, (CRT).

In another embodiment the reflector may be a partially reflecting mirror so the device can operate either in a reflective or transmissive mode.

A second layer of PDLC may be placed after the coloured polarisers with a third colour polariser after the PDLC. The modulation of this second PDLC layer modulates the colour transmitted. Multi-layer combinations may be constructed.

If the droplets are made larger than the conventional size of droplets found in a PDLC, for example they are increased in size to approximately 10 µm in diameter and the liquid crystal droplets consist of cholesteric liquid crystal material with a negative dielectric anisotropy, then the droplets will have the effect of altering the polarisation state of the light. If the pitch, droplet size and layer thickness are set up correctly then the light emerging from the layer may be circularly polarised, or linearly polarised orthogonal to the polarisation of incident light and thus will appear a different colour after passing through the coloured polarisers.

Typically the thickness of the light modulating material is from 0.5 µm to 500 µm thick, preferably it is from 1.0 µm to 250 µm thick, even more preferably it is from 2.0 µm to 20 µm thick.

PDLCs may be operated in a normal or a reverse mode, though they are conventionally operated in a normal mode. Examples of nematic liquid crystal materials which may be used in the PDLCs of this invention include any nematic material having a dielectric anisotropy of greater than 1 for normal mode PDLCs; or in reverse mode PDLC devices, a dielectric anisotropy of less than 0, preferably less than −2.

More specifically, examples of liquid crystal monomers which may be included in the PDLC device include the following:

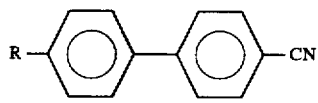

wherein R is straight or branched chain alkyl or alkoxy containing 1–12 carbons.

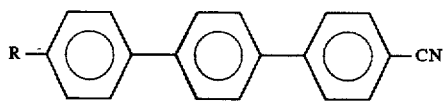

wherein R is straight or branched chain alkyl or alkoxy containing 1–12 carbons.

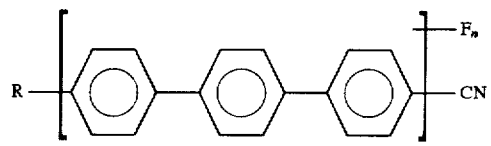

wherein R is straight or branched chain alkyl or alkoxy containing 1–12 carbons and n may be 1 or 2. Preferably n is 1 and preferably the following compound is present in the PDLC droplets:

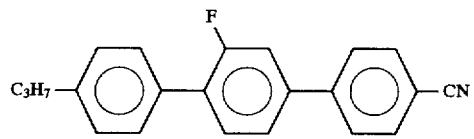

Suitable compositions of liquid crystal materials which may be included in the devices described by the invention include at least one of the compounds having the formula I:

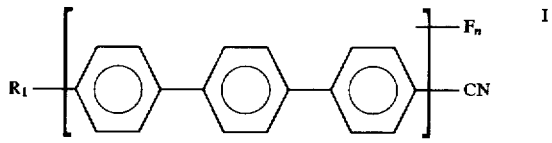

wherein n is 1 or 2, the fluorine substituent(s) may be in any of the available substitution positions and $R_1$ is $C_{1-12}$ alkynyl, hydrogen, R, RO or RCO where R is alkyl or perfluoroalkyl and at least one other of said compounds has a general formula II:

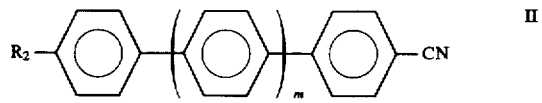

wherein m is 0 or 1 and $R_2$ is hydrogen or $C_{1-12}$ alkyl or alkoxy.

In addition to the materials described by formulae I and II the liquid crystal composition may contain the following type compounds:

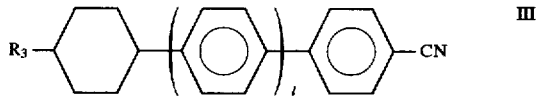

wherein $R_3$ is $C_{1-12}$ alkyl or alkoxy and l is 0 or 1.

In addition to the compounds described by formulae I, II and III the liquid crystal composition may include one or more of the following type compounds, IV, V, VI, VII.

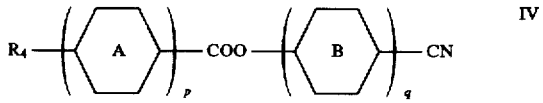

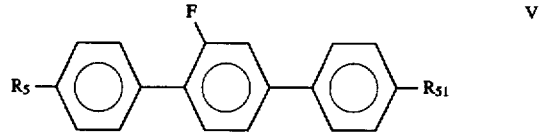

-continued

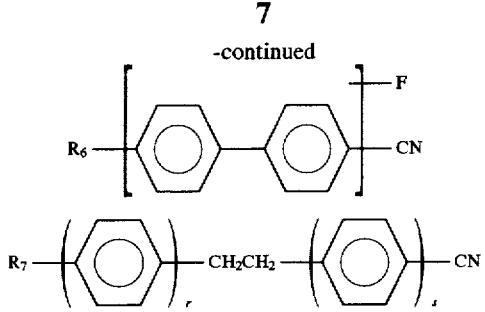

wherein each of $R_4$, $R_5$, $R_5^1$, $R_6$ and $R_7$ is independently $C_{1-12}$ alkyl or alkoxy, rings A and B are independently phenyl or cyclohexyl; p, q, r and s are each independently 1 or 2; and the fluorine substituent in VI may be in any of the available substitution positions.

Suitable compounds described by general formula IV, VI and VII are given by formulae IVA, VIA and VIIA respectively:

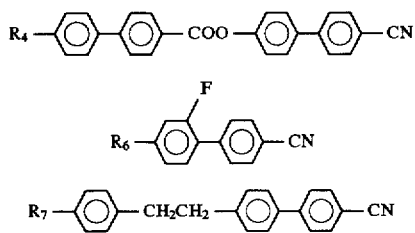

where $R_4$, $R_6$ and $R_7$ are as defined above.

Other suitable compounds include the compounds of the following formula:

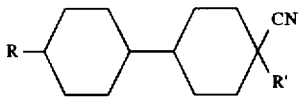

where R is $C_{1-12}$ alkyl or alkox and R' is dependently from R, selected from $C_{1-12}$ alkyl or alkoxy.

Examples of suitable polymer matrices include one or more of the following:

epoxy resins, polyvinyl polymers, polyacrylates, polyurethanes, polyesters and polyarylalkenes. These polymers may be substituted by functional groups.

It may also be possible to incorporate the materials described as being suitable for use in this invention into porous polymers so that liquid crystal impregnated porous polymers result. A known example of a porous polymer or high internal phase emulsion (HIPE) is polyHIPE™.

HIPEs are a route to open cell foams, see references Williams and Wrobleski Langmuir 1988, 4, 656–662 and Williams, Gray and Wilkerson, Langmuir 1990, 6, 437–444.

HIPEs are formed by taking a monomer, a cross-linking agent, a surfactant and water. An emulsion is formed and thin films are prepared. The system is then polymerised and then the water is removed. The remaining thin film of open celled foam may then be filled with liquid crystals. The advantage of this type of PDLC is that the polymer network is formed in the abscence of the liquid crystal, this means that substantially no intermixing between the liquid crystal and the monomeric material takes place. The HIPE may be thoroughly cleaned and/or coated (with an aligning agent for example) before being filled. The inventors of the current invention have taken HIPEs formed from styrene and divinylbenzene and have successfully filled and switched them from a scattering to a non scattering state: Mason, Guy, M<sup>c</sup>Donnell, unpublished results.

For the data presented in Table 1 below 60% by weight of Norland Optical Adhesive number 65 obtainable from Tech Optics Ltd, Kent and 40% BL36—a nematic liquid crystal mixture obtainable from Merck UK were mixed to give a clear isotropic material which was flow filled into a cell consisting of two glass plates, which possessed a clear indium tin oxide conductor on one side, sandwiched together and separated by Mylar spacers. Once the cell had been filled with the adhesive/liquid crystal mix it was exposed to U.V. light. Within the mixture there is photoinitiator present. Some examples of photoinitiator include Darocures and Igacures available from Merck UK such as Darocure 1173 or 4265 and Igacure 651. There are various U.V. curables which are available, some examples are Electrolite corporation materials such as ELC 4481 available through Intertronics Ltd Kidlington Oxon.

Sanritz® coloured polarisers were used, for example a red polariser would be placed on top of a green polariser, in the $V_{OFF}$ state the emerging light would appear red and in the $V_{ON}$ state the colour would appear green. The colours were measured on a Photo Research™ PR-713 Spot spectrascan ™ fast spectral scanner.

Typically a 1 kHz square wave, 60 V rms was applied for the ON state, the OFF state corresponded to 0 V.

TABLE 1

| | Data obtained for 1931 CIE diagram. | | | |
|---|---|---|---|---|
| | | Correspond to | Colour Coords | |
| Colour Polarisers | | $V_{ON}$ or $V_{OFF}$ | X | Y |
| RED | | $V_{OFF}$ | 0.4481 | 0.4404 |
| GREEN | | $V_{ON}$ | 0.3702 | 0.4809 |
| BLUE | | $V_{ON}$ | 0.2493 | 0.3324 |
| YELLOW | | $V_{OFF}$ | 0.3972 | 0.4448 |
| YELLOW | | $V_{OFF}$ | 0.4590 | 0.4513 |
| PURPLE | | $V_{ON}$ | 0.3612 | 0.2851 |
| GREEN ⎤ GREEN ⎦ | | $V_{ON}$ ⎤ $V_{ON}$ ⎦ | 0.3291 | 0.5028 |
| RED | | $V_{OFF}$ | 0.5515 | 0.4010 |

In FIG. 4 data for the invention is illustrated on the 1931 CIE diagram. The data was obtained for when blue and yellow polarisers were used as detailed in Table 1 above. By switching between yellow and blue states at a suitable frequency then a green colour could be obtained. The 'coordinates' of the green colour are shown in FIG. 4 at different frequencies (5 Hz, 10 Hz and 30 Hz) of switching between yellow and blue light. At 30 Hz the coordinates are X=0.3043 and Y=0.3818.

Green, green, red in the Table above indicates that three colour polarisers were used.

We claim:

1. An electro-optic colour device comprising a layer of a light modulating material which comprises a layer of polymer matrix within which is dispersed a liquid crystal composition, said layer of light modulating material positioned between at least two polarisers at least one of the polarisers being coloured, and means for applying an electric field to the light modulating material, the arrangement being such that the colour of light transmitted by the device is modulated by an electric field applied to the light modulating material.

2. A device according to claim 1 wherein the liquid crystal composition is dispersed within the polymer matrix in discrete droplets.

3. A device according to claim 1 wherein the polymer matrix consists of a matrix of interconnecting pores.

4. A device according to claim 1 wherein the layer of light modulating material is sandwiched between two transparent electrode structures the electrode structures being mounted on the inner surface of two transparent substrates.

5. A device according to claim 4, wherein the electrode structures are formed as a 7-bar numeric display.

6. A device according to claim 4, wherein the electrode structures are formed as row and column electrodes.

7. A device according to claim 4, wherein the electrode structures are formed as an r, θ pattern.

8. A device according to any one of claim 1 wherein the light modulating material is from 0.5 μm to 500 μm thick.

9. A device according to any one of claim 1 wherein the light modulating material is from 1.0 μm to 250 μm thick.

10. A device according to any one of claim 1 wherein the light modulating material is from 2.0 μm to 20 μm thick.

11. A device according to claim 1 wherein the coloured polariser comprises at least two sheets of coloured polarising material.

12. A device according to claim 11 wherein the two colour polarisers are arranged at an angle of from 60° to 120° to each other.

13. A device according to claim 12 wherein the two colour polarisers are arranged at substantially 90° to each other.

14. A device according to claim 1 wherein the relationship of the non-coloured polariser to the coloured polariser is such that the angle subtended by the non-colour polariser to one of the coloured polarisers is 0°–5° and the angle subtended by the non-colour polariser to the other colour polariser is 85°–95°.

15. A device according to claim 1 wherein the liquid crystal composition is a mixture of at least two compounds, at least one of the said compounds having a general formula I:

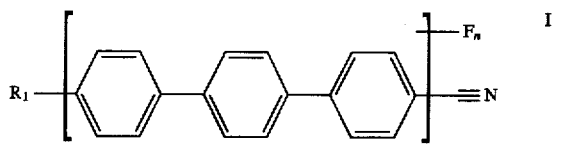

wherein n is 1 or 2, the fluorine substituents may be in any of the available substitution positions and $R_1$ is $C_{1-12}$ alkynyl, hydrogen, R, RO or RCO where R is alkyl or perfluoroalkyl and at least one other of said compounds has a general formula II:

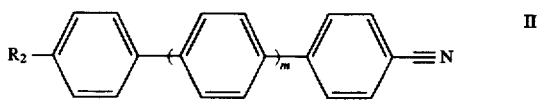

wherein $R_2$ is hydrogen or $C_{1-12}$ alkyl or alkoxy and m is 0 or 1.

16. A device according to claim 15 wherein the composition additionally includes one or more compounds of formula III

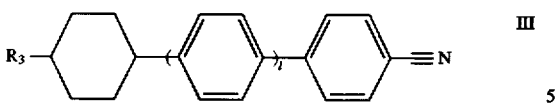

wherein $R_3$ is $C_{1-12}$ alkyl or alkoxy and l is 0 or 1.

17. A device according to claim 15 wherein at least one compound of the composition has the following formula:

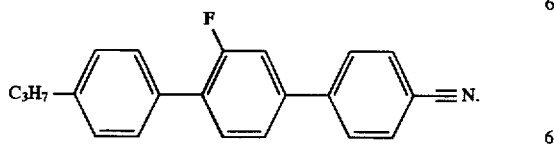

18. A device according to any one of claim 15 wherein the composition includes one or more compounds selected from the following:

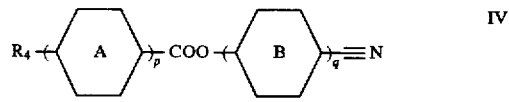

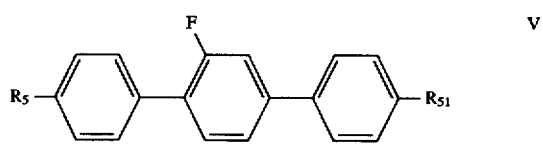

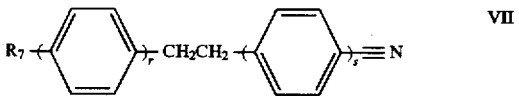

wherein each of $R_4$, $R_5$, $R_{51}$, $R_6$ and $R_7$ is independently $C_{1-12}$ alkyl or alkoxy, rings A and B are independently phenyl or cyclohexyl; p,q,r and s are each independently 1 or 2; and the fluorine substituent in VI may be in any of the available substitution positions.

19. A device according to claim 18 wherein compounds of Formulae IV, VI and VII are respectively:

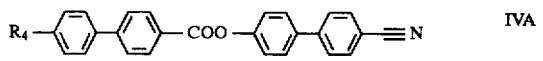

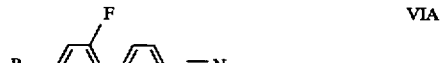

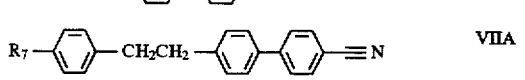

where $R_4$, $R_6$ and $R_7$ are as defined in claim 18.

20. A device according to claim 1 wherein the polymer matrix is selected from one or more of epoxy resins, polyvinyl polymers, polyacrylates, polyurethanes polyesters and polyarylalkenes.

21. A device according to claim 1 wherein the polymer matrix is formed from a polymerised high internal phase emulsion.

22. A device according to claim 1 wherein the device is operated in a reverse mode.

23. An electro-optic colour device comprising a layer of a light modulating material which comprises a layer of polymer matrix within which is dispersed a liquid crystal composition, said layer of light modulating material positioned between at least two polarisers at least one of the polarisers being coloured, and means for applying an electric field across the light modulating material, the arrangement being such that by switching the light modulating material between scattering and non-scattering states there results a change in colour of light transmitted by the device.

* * * * *